Patented Aug. 23, 1932                                    1,873,290

UNITED STATES PATENT OFFICE

SAMUEL COFFEY, OF BLACKLEY, MANCHESTER, ENGLAND, ASSIGNOR TO IMPERIAL CHEMICAL INDUSTRIES LIMITED, OF WESTMINSTER, ENGLAND

MANUFACTURE OF TRIARYLCARBINOLS

No Drawing. Application filed December 26, 1929, Serial No. 416,745, and in Great Britain January 1, 1929.

Acree (Amer. Chem. J. 1903, 29, 588–609), has shown that benzophenone and similar diaryl ketones react with sodium and aromatic bromo-compounds in the presence of dry ether to give triarylcarbinols and other products. More recent research (cf. Schlenk, Ber. 1914, 47, 487) has indicated that the course of the reaction is not that imagined by Acree but is more probably as follows:

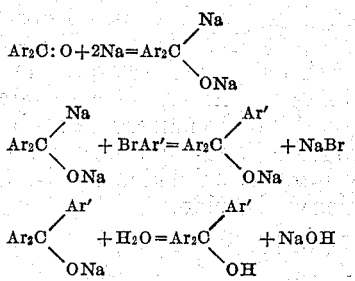

The yields obtained by Acree's method are, however, poor, especially when the attempt is made to extend the reaction to other diaryl ketones, and in particular to the use of aromatic chloro compounds.

In Ser. Nos. 155098 and 315100 cases are described in which, under special conditions, tetraalkyldiaminobenzophenones are caused to react with aromatic halogeno compounds to yield the carbinol form of various triarylmethane dyestuffs.

I have now found that under conditions somewhat similar to those employed in the above mentioned specifications, but which are completely different from those employed by Acree, there can be obtained from diarylketones of the general formula

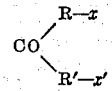

(in which R, R' represent the same or different aryl residues and $x$, $x'$ represents hydrogen or an alkoxyl group), triaryl carbinols in good yield.

According to our invention a mixture of the ketone and the halogeno-compound is added to the alkali metal in hot benzene or other suitable diluent at such a rate as to keep the reaction, once started, proceeding vigorously. Usually, when all the metal has disappeared, the reaction product is poured into water and the diluent is removed by steam distillation, but occasionally it is desirable to continue heating for some time before working up the reaction products (see Example 6). The carbinol remains behind and can be purified, if desired, by any of the usual methods. In my process, it is advantageous to first form a liquid mixture comprising the ketone and the halogeno-compound and a sufficient amount of an inert solvent to give said liquid mixture, and then gradually add this first liquid mixture to a second liquid mixture comprising an alkali metal and an inert liquid. As stated above this second liquid mixture is heated or warmed. After the first portion is added the reaction is started, and further gradual addition of the first liquid mixture carries forward the reaction; the reaction mixture boiling steadily. The evaporated liquid is refluxed, that is condensed and returned to the liquid reaction mixture. In this way, the reaction is effected in a controlled and advantageous manner.

Any diarylketone of the general formula

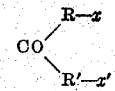

in which $x$ and $x'$ represent hydrogen or an alkoxy group, may be employed according to my invention. As examples of such bodies I mention benzophenone, ditolylketones, dianisylketone (Schnackenberg and Scholl, Ber 36 (1903) p. 654; Journal of Chemical Society Abstracts 1903, page 341) and phenyl-α-naphthyl ketone.

The halogen compounds may be any halogenated aromatic hydrocarbon derivative which does not contain other reactive groups such as nitro groups, primary amino groups, carboxylic groups, sulphonic groups and phenolic groups.

The alkali metal may be sodium, potassium, lithium etc. or alloys of these.

My invention is illustrated but not limited by the following examples, in which the parts are by weight.

Example 1. Diphenyl-p-tolylcarbinol from benzophenone and p-chlorotoluene 46 parts of granulated sodium are placed in a reflux apparatus fitted with an agitator along with a convenient amount of benzene, (e. g. 150 parts). The mixture is rapidly stirred and the benzene warmed to its boiling point. A mixture of benzophenone, 182 parts, and p-chlorotoluene 128 parts is then made and sufficient benzene added to keep the mixture liquid at ordinary temperatures (on warm days the addition of benzene is unnecessary). A small quantity of this mixture, say 20 parts, is then added to the warm sodium and benzene, which is kept warm until the reaction commences, as is evidenced by the formation of a blue colour in the liquid. The source of heat is then removed and the ketone-chlorotoluene mixture is added at such a rate that the benzene boils steadily. When all the ketone-chlorotoluene mixture has been added the reaction vessel is kept warm for a short time to complete the reaction, after which the contents are cooled and drowned in water.

The solvent is removed by distillation in steam, and the crude carbinol remains behind as a pale brown, viscous liquid. It may be purified by adding 500 parts warm light petroleum, separating off the petroleum solution from the aqueous liquor and allowing the former to crystallize on cooling. Its melting point is 72–73° C.

Example 2. Phenyldi-p-tolylcarbinol from di-p-tolyl ketone and bromobenzene 46 parts of granulated sodium are stirred with 100 parts hot benzene and a mixture of di-p-tolyl ketone (210 parts) and bromobenzene (160 parts) in sufficient warm benzene to form a solution (about 300 parts) is added at such a rate as to keep the benzene solution boiling. Towards the end of the addition heat is applied to the reaction vessel and the mixture kept at the boil for half an hour after the addition is finished. The reaction product is then cooled, drowned in water, the solvent removed by steam distillation and the crude viscous carbinol purified by recrystallization from light petroleum or other suitable solvent. It then has a melting-point 76–77° C.

Example 3. Triphenyl carbinol

To 46 parts of granulated sodium, suspended in 200 parts of boiling benzene, a small fraction of a solution composed of 182 parts benzophenone, 113 parts of chlorobenzene, and 200 parts of benzene is added, and when after a period of about 20 minutes an intense blue colour develops, the gradual addition of the main bulk of liquid is begun. The boiling temperature is maintained without external heating by regulating the flow of liquid, until the reaction is complete. The mass is then extracted with water, and steam distilled. The crude carbinol crystallizes on cooling.

Example 4. Triphenyl carbinol 78 parts of potassium metal are melted under 300 parts of benzene, and while stirring and boiling a solution of 182 parts of benzophenone and 113 parts chlorobenzene in 200 parts of benzene is slowly added. The reaction begins at once, with development of a blue colour, and external heating is unnecessary throughout the addition. The carbinol is isolated as in the previous example.

Example 5. 4-methoxytriphenyl carbinol 46 parts of granulated sodium are suspended in 200 parts of pure ether, and while stirring, a solution of 143 parts of p-chloroanisole, 182 parts benzophenone, and 300 parts of ether is allowed to flow in slowly. The reaction begins at once at the boiling point of ether, and continues throughout without external heating. The solution is finally extracted with water, and volatile matter is then driven off with steam; the viscous carbinol remaining may be crystallized from ether, ligroin mixture or converted directly into the chloride, e. g. by treatment with thionyl chloride.

Example 6. Diphenyl-α-naphthyl carbinol

A solution composed of 158 parts bromobenzene, 232 parts phenyl-α-naphthyl ketone, and 300 parts of benzene is allowed to flow very slowly into a vessel in which 46 parts of granulated sodium are stirred with 200 parts of boiling benzene. When the addition is complete, the mass is stirred and heated 24 hours longer and then treated with water. Volatile matter is driven off by a current of steam and the carbinol solidifies.

Example 7. 4:4'-dimethoxytriphenyl carbinol

To 46 parts of granulated sodium in 200 parts of boiling benzene, 5% of a solution composed of 143 parts p-chloroanisole, 224 parts 4-methoxy benzophenone, and 300 parts of benzene is added. After boiling for 30 minutes a deep blue colour develops and fades again, and a vigorous evolution of heat occurs. The rest of the solution is then run in slowly, at such a rate that the boiling temperature is maintained without external heating. When all is added the mass is boiled for 2 hours more, treated with water, and a current of steam is passed to recover the benzene. The viscous crude carbinol may be crystallized from suitable solvents, or converted directly into the corresponding triphenyl chlormethane.

In the above examples, metallic lithium may be used in place of sodium or potassium metal, or there may also be used alloys of any two or of all three of these metals.

Having now particularly described and ascertained the nature of my said invention and in what manner the same is to be performed, I declare that what I claim is:—

1. In the manufacture of triaryl carbinol compounds of the type represented by the following formula:

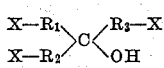

wherein X represents hydrogen, an alkyl or alkoxy group, $R_1$ represents a benzene or naphthalene nucleus and $R_2$ and $R_3$ represent benzene nuclei, and in which when $R_1$ is a naphthalene nucleus, the X attached thereto represents hydrogen, from a benzophenone compound having the probable formula:

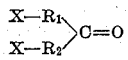

wherein X, $R_1$ and $R_2$ have the same significance as above, and a halogenated compound having the formula:

$$Y-R_3-X$$

wherein Y represents chlorine or bromine and in which X and $R_3$ have the same significance as above, the process which comprises preparing first a liquid mixture of an inert organic liquid and an alkali metal by heating together said liquid and said metal, preparing a second liquid mixture comprising an inert organic liquid, said benzophenone compound and said halogenated aryl compound, gradually adding the second liquid mixture to the first liquid mixture at such a rate that the reaction mixture is maintained at boiling temperature, thus effecting reaction between the said benzophenone compound and the said halogenated aryl compound in the presence of a boiling liquid mixture comprising an inert liquid and an alkali metal, in a controlled manner to form said triaryl carbinol.

2. The process of claim 1 in which the benzophenone compound is a body having the probable formula

wherein $R_1$ and $R_2$ represent a benzene nucleus.

3. The process of claim 1 in which the halogenated aryl compound is a body having the probable formula $$Y-R_3-R_4$$

wherein $R_3$ represents a benzene nucleus, Y represents chlorine or bromine, and $R_4$ represents an alkyl group.

4. The process of claim 1 in which the benzophenone compound is a body having the probable formula

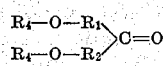

wherein $R_1$ and $R_2$ represent a benzene nucleus, and $R_4$ represents an alkyl group.

5. The process of claim 1 in which the halogenated aryl compound is a body having the probable formula $$Y-R_3-O-R_4$$

wherein $R_3$ represents a benzene nucleus, Y represents chlorine or bromine, and $R_4$ represents an alkyl group.

6. The process of claim 1 in which the halogenated aryl compound is a body having the probable formula $$X-R_3-Cl$$

wherein $R_3$ represents a benzene nucleus and X represents hydrogen, an aklyl or alkoxy group.

7. The process of claim 1 in which the inert liquid is ether.

8. The process of claim 1 in which the alkali metal is sodium.

9. The process of claim 1 in which the alkali metal is an alloy comprising two or more alkali metals.

10. In the manufacture of triaryl carbinols, the process which comprises reacting together a benzophenone compound having the probable formula

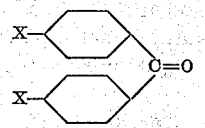

wherein X represents hydrogen, an alkyl or alkoxy group, and a halogenated aryl compound having the probable formula

wherein Y represents chlorine or bromine, and X represents hydrogen, an alkyl or alkoxy group, the said reaction being effected in the presence of a boiling liquid mixture comprising an inert liquid and an alkali metal.

11. In the manufacture of triaryl carbinols, the process which comprises reacting together a benzophenone compound having the probable fomula

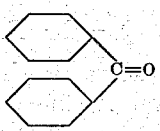

and a halogenated aryl compound having the probable formula

the said reaction being effected in the presence of a boiling liquid mixture comprising ether and sodium.

12. In the manufacture of triaryl carbinols, the process which comprises reacting together a benzophenone compound having the probable formula

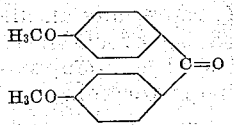

and a halogenated aryl compound having the probable formula

the said reaction being effected in the presence of a boiling liquid mixture comprising benzene and sodium.

13. In the manufacture of triaryl carbinols, the process which comprises reacting together a benzophenone compound having the probable formula

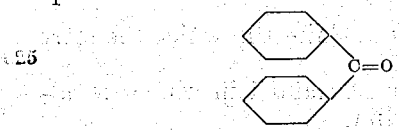

and a halogenated aryl compound having the probable formula

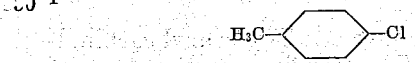

the said reaction being effected in the presence of a boiling liquid mixture comprising benzene and sodium.

14. In the manufacture of triaryl carbinols of the type represented by the following formula:

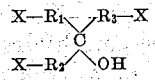

wherein X represents hydrogen, an alkyl or alkoxy group, $R_1$ represents a benzene or naphthalene nucleus and $R_2$ and $R_3$ represent benzene nuclei, and in which when $R_1$ is a naphthalene nucleus, the X attached thereto represents hydrogen, from a benzophenone compound having the probable formula:

wherein X, $R_1$ and $R_2$ have the same significance as above, and a halogenated compound having the formula:

wherein Y represents chlorine or bromine and in which X and $R_3$ have the same significance as above, the process which comprises gradually adding a liquid mixture comprising said benzophenone compound, said halogenated aryl compound and an inert liquid to a second liquid mixture comprising an inert liquid and an alkali metal, to effect reaction and form said triaryl carbinol, the said second liquid mixture being at a temperature sufficient to effect an initial reaction and the reaction being controlled by gradually adding the first liquid mixture to the second liquid mixture at such a rate as to maintain the reaction mixture at its boiling point, and by condensing and returning the boiled off inert liquid to the reaction mixture.

In testimony whereof I affix my signature.

SAMUEL COFFEY.